(12) United States Patent
Griffith

(10) Patent No.: US 6,603,847 B1
(45) Date of Patent: Aug. 5, 2003

(54) INCOMING CALL ROUTING SYSTEM WITH INTEGRATED WIRELESS COMMUNICATION SYSTEM

(75) Inventor: Gary L. Griffith, Arvada, CO (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/248,965

(22) Filed: Feb. 12, 1999

(51) Int. Cl.[7] .............................................. H04M 3/42
(52) U.S. Cl. ........................ 379/211.02; 379/214.01; 379/201.02; 379/88.18; 379/265.02
(58) Field of Search ....................... 379/265.01, 265.02, 379/88.18, 214.01, 201.02

(56) References Cited

U.S. PATENT DOCUMENTS

| | | | | |
|---|---|---|---|---|
| 5,018,191 A | * | 5/1991 | Catron ........................ 379/100 |
| 5,027,384 A | * | 6/1991 | Morganstein .......... 379/207.05 |
| 5,327,486 A | * | 7/1994 | Wolff et al. ............. 379/142.01 |
| 6,327,363 B1 | * | 12/2001 | Henderson ............. 379/265.01 |

OTHER PUBLICATIONS

Jul. 1990 Inbound/Outbound Magazine.*
Nov. 1989 Inbound/Outbound Magazine.*
May 1990 Inbound/outbound Magazine.*

* cited by examiner

Primary Examiner—Ahmad F. Matar
Assistant Examiner—Rasha S Al-Aubaidi
(74) Attorney, Agent, or Firm—Patton Boggs LLP

(57) ABSTRACT

The incoming call routing system for a communication system that serves a facility, and which functions to automatically direct the incoming call to the specific service provider who is presently assigned to provide services for an identified resident of the facility. This is accomplished by providing an incoming call routing system, and optionally an integrated wireless communication system, to automatically effect the desired communication connections. The present description uses the hospital communication system as a well known example of such a communication environment in which the present system incoming call routing system is operational. The incoming call routing system of the hospital communication system functions to identify the hospital patient about whom the calling party is requesting information. The calling party is provided with a voice prompt based menu to enable the calling party to select the one particular class of care giver that can provide the calling party with the desired information. The incoming call routing system uses the patient identity data and the calling party's responses to the menu to identify the particular care giver who is presently assigned the responsible to provide specific information about this patient. The identity of this care giver is then translated into the telephone number of the wireless communication device or wired telephone used by this identified care giver. An incoming communication connection is then established from the calling party through the wireless communication system to the identified care giver's wireless communication device.

10 Claims, 3 Drawing Sheets

| ROOM # | PATIENT | | SHIFT 1 | SHIFT 2 | SHIFT 3 | TREATING PHYSICIAN | DIAGNOSIS/STATUS |
|---|---|---|---|---|---|---|---|
| | NAME | ID | | | | | |
| 301A | SMYTH | 10112 | PRIMARY CARE REYNOLDS 12-0 SECONDARY CARE NESSE 12-4 | PRIMARY CARE BEKIN 12-1 SECONDARY CARE WILLMAN 12-5 | PRIMARY CARE ULMER 12-2 SECONDARY CARE PUREL 12-6 | EDGAR 303-555-1234 | FAIR CONDITION PNEUMONIA |
| 301B | ELLER | 13245 | PRIMARY CARE REYNOLDS 12-0 SECONDARY CARE NESSE 12-4 | PRIMARY CARE BEKIN 12-1 SECONDARY CARE WILLMAN 12-5 | PRIMARY CARE ULMER 12-2 SECONDARY CARE PUREL 12-6 | MEDITOR 303-555-0945 | TWO DAYS POSTOP RT HIP REPLACEMENT |
| 302A | FORBEG | 12113 | PRIMARY CARE REYNOLDS 12-0 SECONDARY CARE NESSE 12-4 | PRIMARY CARE BEKIN 12-1 SECONDARY CARE WILLMAN 12-5 | PRIMARY CARE ULMER 12-2 SECONDARY CARE PUREL 12-6 | EDGAR 303-555-1234 | EXCELLENT CONDITION ACUTE SINUSITIS |

FIG. 3

| ROOM # | PATIENT | | SHIFT 1 | SHIFT 2 | SHIFT 3 | TREATING PHYSICIAN | DIAGNOSIS/STATUS |
|---|---|---|---|---|---|---|---|
| | NAME | ID | | | | | |
| 301A | SMYTH | 10112 | PRIMARY CARE REYNOLDS 12-0 SECONDARY CARE NESSE 12-4 | PRIMARY CARE BEKIN 12-1 SECONDARY CARE WILLMAN 12-5 | PRIMARY CARE ULMER 12-2 SECONDARY CARE PUREL 12-6 | EDGAR 303-555-1234 | FAIR CONDITION PNEUMONIA |
| 301B | ELLER | 13245 | PRIMARY CARE REYNOLDS 12-0 SECONDARY CARE NESSE 12-4 | PRIMARY CARE BEKIN 12-1 SECONDARY CARE WILLMAN 12-5 | PRIMARY CARE ULMER 12-2 SECONDARY CARE PUREL 12-6 | MEDITOR 303-555-0945 | TWO DAYS POSTOP RT HIP REPLACEMENT |
| 302A | FORBEG | 12113 | PRIMARY CARE REYNOLDS 12-0 SECONDARY CARE NESSE 12-4 | PRIMARY CARE BEKIN 12-1 SECONDARY CARE WILLMAN 12-5 | PRIMARY CARE ULMER 12-2 SECONDARY CARE PUREL 12-6 | EDGAR 303-555-1234 | EXCELLENT CONDITION ACUTE SINUSITIS |

INCOMING CALL ROUTING SYSTEM WITH INTEGRATED WIRELESS COMMUNICATION SYSTEM

FIELD OF THE INVENTION

This invention relates to communication systems that serve a facility which provides the residents of the facility with an array of services, such as hospital or hotel, and, in particular, to the use of an incoming call routing system that is integrated with a wireless communication system to automatically and efficiently implement communication connections between a calling party, who is requesting information about a resident in an assigned room of the facility, and the service provider assigned to that resident.

Problem

It is a problem in communication systems, such as hospital communication systems, to efficiently place a call to the appropriate service provider for an individual who is resident in a particular room, if the calling party does not know the identity of the service provider. Existing hospital communication systems are wireline communication systems comprising patient intercom units that are typically mounted in the wall of the hospital room proximate to the location of the patient bed, that is wired through a switching system to a corresponding one of the nurses' intercom units that are installed in each nurses' station that is associated with the particular set of hospital rooms. These communication systems also serve a plurality of telephones that are provided in the offices, laboratories and other locations in the facility.

The hospital patient call bell incoming system enables the patient to communicate with the appropriate care giver for that patient. The hospital patient call bell system includes a patient operated switch that initiates the hands-free communication from the patient's incoming unit to the nurses' station that serves that patient room. In operation, a care giver at the nurses' station answers the incoming page and communicates with the patient to determine the nature of the patient request. If the care giver is not the person who can provide the requested information for the requesting patient, the care giver must record the request and locate the care giver who has the requested information for that patient and relay the received request. In addition, when a calling party telephones from outside of the facility to speak with a care giver regarding a particular patient, the calling party must be routed through the hospital communication system operator, who must attempt to identify the appropriate individual who can serve the calling party's request. The individual receiving the calling party's request must typically take a number of steps to determine the appropriate response and then establish an outgoing communication connection to the calling party to provide the requested information. As the staffing changes on a per shift basis, the appropriate interconnection of the calling party with the appropriate staff member becomes a difficult task. Therefore, the call completion rate is very low and the information exchange among the nursing staff, physicians, patients, and patient families is inefficient, using the present communication system.

Solution

The above described problems are solved and a technical advance achieved in the field by the present incoming call routing system for a communication system that serves a facility, and which functions to automatically direct the incoming call to the specific service provider who is presently assigned to provide services for an identified resident of the facility.

This is accomplished by providing an incoming call routing system, and optionally an integrated wireless communication system, to automatically effect the desired communication connections. The present description uses the hospital communication system as a well known example of such a communication environment in which the present system incoming call routing system is operational. The incoming call routing system of the hospital communication system functions to identify the hospital patient about whom the calling party is requesting information. The calling party is provided with a voice prompt based menu to enable the calling party to select the one particular class of care giver that can provide the calling party with the desired information. The incoming call routing system uses the patient identity data and the calling party's responses to the menu to identify the particular care giver who is presently assigned the responsibility to provide specific information about this patient. The identity of this care giver is then translated into the telephone number of the wireless communication device or wired telephone used by this identified care giver. An incoming communication connection is then established from the calling party through the wireless communication system to the identified care giver's wireless communication device.

BRIEF DESCRIPTION OF THE DRAWING

FIG. 3 illustrates a typical data record structure used in the present incoming call routing system.

DETAILED DESCRIPTION

Figure 1:
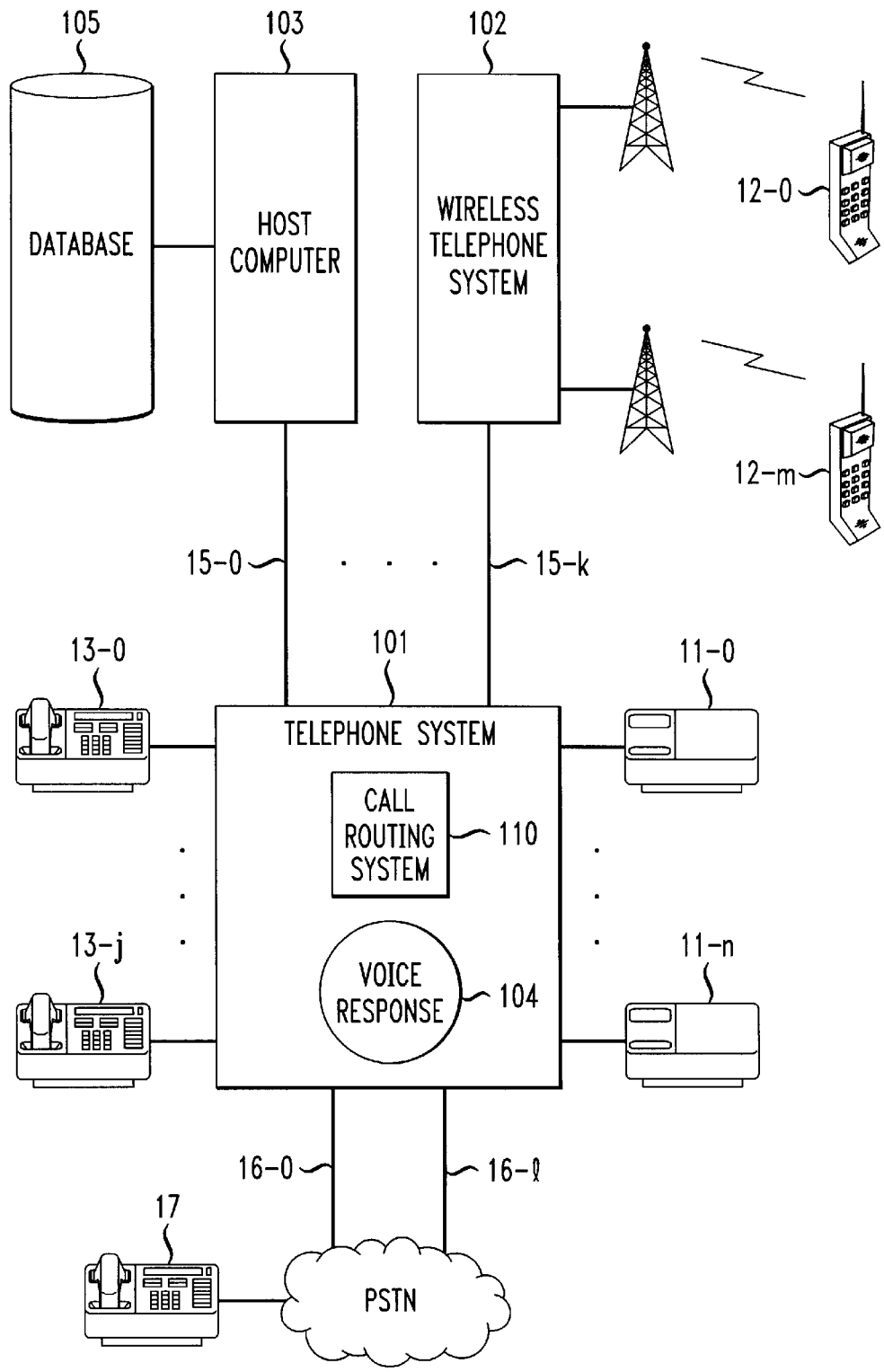
FIG. 1 illustrates in block diagram form the overall architecture of the present incoming call routing system.
Figure 2:
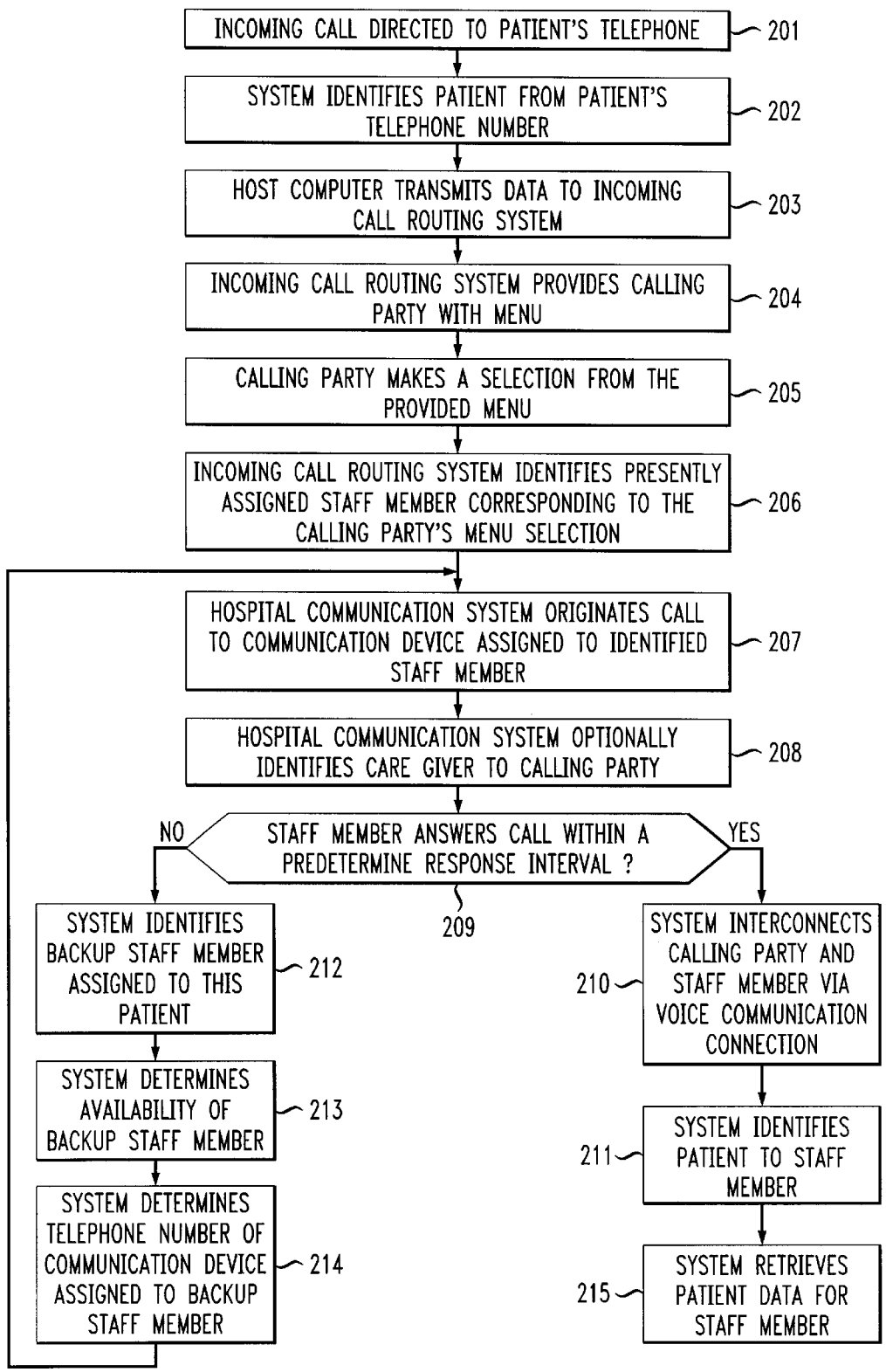
FIG. 2 illustrates in flow diagram form the operational steps taken by the present incoming call routing system to process an incoming call connection.

FIG. 1 illustrates in block diagram form the overall architecture of the present incoming call routing system, and FIG. 2 illustrates in flow diagram form the operational steps taken by the present incoming call routing system to process an incoming call connection. In particular, the incoming call routing system is typically installed in the traditional hospital environment to serve the patients that are cared for in that facility and their family members who telephone the hospital to obtain patient status information, although other in-building applications of this incoming call routing system can be envisioned where the resident is assigned a designated assistant who is not restricted to a particular physical location in the facility, such as in the case of a hotel, where a block of guest rooms are served by a particular service person.

The basic architecture of the hospital communication system 100 comprises a wireless communication system 102, such as an in-building cellular communication system, that serves to establish communication connections among a plurality of wireless communication devices 120 to 12-$m$ and the communication trunks 15-0 to 15-$k$ that serve to interconnect the wireless communication system 102 with telephone system 101. The telephone system 101 serves to establish communication connections among the plurality of patient telephone devices 11-0 to 11-$n$, telephone station sets 13-0 to 13-$j$, communication trunks 15-0 to 15-$k$, and central office trunks 16-0 to 16-$l$ that connect the hospital communication system 100 to the Public Switched Telephone Network (PSTN). In addition, the hospital communication system 100 optionally includes a host computer 103, with associated data storage devices 105, that are connected to and serve data terminal devices (not shown). In operation, hospital staff members access the data stored on the data storage devices via host computer 103 which functions as a server and gateway to prevent unauthorized access to the sensitive patient data that is stored on the data storage devices 105. The hospital staff use data terminal devices to input, modify and retrieve patient data from the data terminal devices in well known fashion. Similarly, the operation of the wireless communication system and the plurality of wireless communication devices 12-0 to 12-m that it serves is well known and not disclosed in detail herein.

The patient telephone devices 11-0 to 11-n are the traditional telephone station sets that are used by the patients to receive calls from calling parties and to originate calls either within the hospital or to parties located outside of the hospital. These patient telephone devices 11-0 to 11-n are directly connected to the telephone system 101 and operate in well known manner to effect communications between the patient and other parties. In the present system, the incoming call routing system 110 functions to provide a calling party, who telephones the patient telephone device 11-0 that is assigned to a particular patient, with a menu of choices to thereby enable the calling party to identify the hospital staff member by job function and be directly connected to the presently assigned staff member who implements the identified function. The identity of this patient is used by the telephone system 101 to access the patient data stored in the host processor 103 and its associated data storage devices 105 to determine the patient to staff member correspondence. The identity of the patient is used to identify the care giver who is presently assigned the responsibility of caring for the patient whose telephone number was dialed by the calling party. The incoming call routing system 110 then extends the communication connection to the identified staff member, typically via the wireless communication system 102.

Wireless Communication System

As an example of the operation of a typical wireless communication system 102, when a call connection is originated by a wireless telephone subscriber, the wireless communication system 102 detects the call origination and identifies the wireless telephone station 12-0 used by the wireless telephone subscriber via the unique station set identification data stored in the wireless telephone station 12-0. The wireless communication system 102 scans the data entries in the home location register HLR to verify the wireless telephone subscriber's authority to access the requested call services. The wireless communication system 102, upon verifying the authorization of the wireless subscriber to obtain the requested services, then processes the call origination in well known fashion to interconnect the wireless telephone subscriber with the designated destination.

If the designated destination is a subscriber station 13-0 served by the telephone system 101, the wireless telephone system 102 extends the call connection and the identification of the wireless subscriber's designated destination to the telephone system 101 via one of the trunks 15-0 to enable the telephone system 101 to complete the call connection. The above noted call connection scenario is well known in wireless telephone systems 102.

Operation of the Incoming Call Routing System

The operation of the hospital communication system 100 is illustrated in flow diagram form in FIG. 2 in the example of calling party originating a communication connection to the hospital communication system 100 to be interconnected with the presently assigned care giver for a particular patient. At step 201, the calling party originates an incoming call to the telephone station 11-0 associated with a particular patient resident in the hospital that is served by the hospital communication system 100. In response to the receipt on an incoming call by the hospital communication system 100, the incoming call routing system 110 identifies the patient telephone station 11-0 and uses this information to access the patient data via host computer 103 and the data storage devices 105. The patient identity is typically stored in the data storage devices 105, along with the identity of the primary care giver who is presently assigned to this patient. A typical data structure that can be used for this purpose is illustrated in FIG. 3, wherein the data includes relevant data that includes, but is not limited to: patient room and bed location, patient name, patient ID number, list of assigned primary and backup care giver for each work shift in the day and their wireless contact numbers, identity of the treating physician and contact telephone number, patient diagnosis and status, and the like. The host computer at step 202 determines from this data record the identity of the patient assigned to this patient telephone station 11-0 and at step 203 the host computer 103 forwards a predetermined amount of this data excerpted from the patient data record to the telephone system 101.

At step 204, the incoming call routing system 110 activates the voice response unit 104 to provide the calling party with a menu of call routing choices. For example, the menu can indicate the following script as a typical set of choices when the calling party has called the telephone station 11-0 assigned to a patient named John Molloy:

If you would you like to speak to:
John Molloy, press 1
John Molloy's nurse, press 2
John Molloy's doctor, press 3
John Molloy's nurses station, press 4
John Molloy's physical therapist, press 5

The calling party makes a selection from the presented menu at step 205 in well known fashion by depressing the key on the keypad of their telephone station set corresponding to the numeric selection listed in the menu. Alternatively, the vioce response unit 104 can be operational to recognize spoken responses from the calling party in place of the keypad input. The incoming call routing system 110 determines the telephone number of the telephone station set or wireless communication device that is assigned to the staff member presently assigned to perform the function corresponding to the calling party's selection either from the data that is provided by host computer 103 or data resident in wireless telephone system 102. Assume that the identified staff member is served by a wireless communication device 12-0. At step 206, the telephone system 101 extends the communication connection over a selected one of the trunks 15-0 to the wireless telephone system 102 and the availability of the identified staff member is determined via the active state of the wireless communication device 12-0 that is assigned to this staff member. At step 207, the wireless telephone system 102 originates the wireless segment of the communication connection to the wireless communication device 12-0 and provides audible feedback to the patient. For example, the identity of the assigned primary staff member can optionally be provided to the voice response unit 104, which can then translate this data into an audible message at step 208 to the patient to identify the name of the primary staff member and the fact that the communication connection to this individual has been initiated. The telephone system 101 can also provide audible ring back tone as is presently done in incoming systems.

The incoming call routing system 110 at step 209 monitors the duration of the communication connection and if the staff member answers the call within a predetermined amount of time, the communication connection is extended from the calling party to the wireless communication device 12-0 at step 210 and optionally, the staff member answering the call is given an audible indication of the patient identity via voice response unit 104 at step 211. The staff member can communicate with the calling party and optionally, retrieve patient data at step 215 via this communication connection from the data that is stored in the host computer 103 and its associated data storage devices 104. The staff member can thereby provide rapid response to the calling party request and access at least a portion of the patient records to provide an informed response to the calling party.

If at step 209, the staff member does not respond to the wireless communication connection, the incoming call routing system 110 at step 212 identifies the backup staff member assigned to this patient and at step 213 determines the telephone number of this staff member and at step 214 the availability of this backup staff member as noted above. Processing then returns to step 207 or 209 and the communication connection is redirected to the backup staff member via the wireless telephone system 102 paging the wireless communication device 12-m assigned to this individual.

Additional System Features

The staff member or unit clerk can administer the staff member data that is stored in the host computer 103 to direct call bell incoming call routing calls for a particular set of patients to an assigned staff member. If the assigned staff member is occupied or otherwise unavailable, the call direction data can be updated to enable the incoming call routing system 110 to provide a communication connection to the presently available staff member, without the need for call rerouting. The wireless telephone system 102 automatically and immediately confirms the presence of the assigned staff member by scanning the list of presently active staff member wireless communication devices and can generate an alarm if there is a disparity between the list of assigned staff members and the staff members presently active on the wireless telephone system 102. In addition, the location of the staff members can be determined to a fine level of granularity to determine the proximity of the staff member to the patient and redirect the call bell incoming call routing call to a backup staff member who is in closer proximity to the patient.

Summary

The incoming call routing system functions to automatically direct the incoming call to the specific staff member who is presently assigned to provide care for a particular patient, and also optionally provides the staff member with data regarding the patient to facilitate efficient and immediate communication between the calling party and the staff member presently assigned to provide services for the identified patient.

What is claimed:

1. An incoming call routing system operable with a private branch exchange switching system for establishing communication connections from a calling party to a selected one of service personnel who are assigned to serve a subscriber who is assigned a particular telephone station served by said private branch exchange switching system and having a unique telephone number, wherein the purpose of said incoming call is not to communicate with said subscriber, comprising:

means, responsive to an incoming communication connection directed to said unique telephone number, for presenting a calling party on said incoming communication connection with a menu indicative of a plurality of call routing choices;

means, responsive to said unique telephone number and said calling party transmitting data on said incoming communication connection indicative of a selection from said menu, for determining an identity of a one of service personnel assigned to serve a subscriber associated with said unique telephone number, comprising:

means, operable to the exclusion of said subscriber, for storing data indicative of said unique telephone number and a set of said service personnel presently assigned to serve said subscriber associated with said unique telephone number, means for associating each of said menu choices with a corresponding one of said set of said service personnel presently assigned to serve said subscriber associated with said unique telephone number; and means for routing said incoming communication connection to a communication device assigned to said identified one of said service personnel to enable said one of said service personnel to provide information to said calling party, which information relates to the subscriber and is desired by the calling party.

2. The incoming call routing system of claim 1 wherein said means for determining further comprises:

means for storing data indicative of a telephone number of a one of said communication devices assigned to said identified one of service personnel.

3. The incoming call routing system of claim 2 wherein said means for determining further comprises:

means for storing subscriber specific data; and means for transmitting said subscriber specific data to said identified one of service personnel via said incoming communication connection.

4. The incoming call routing system of claim 1 wherein said means for routing comprises:

wireless communication system means, connected to said private branch exchange switching system, for establishing a wireless communication connection from said private branch exchange switching system to a wireless communication device assigned to said identified one of service personnel.

5. The incoming call routing system of claim 1 further comprising:

means, responsive to establishment of said incoming communication connection, for providing data to said identified one of service personnel that identifies said subscriber.

6. A method of operating an incoming call routing system operable with a private branch exchange switching system for establishing communication connections from a calling party to a selected one of service personnel who are assigned to serve a subscriber who is assigned a particular telephone station, wherein the purpose of said incoming call is not to communicate with said subscriber, comprising the steps of:

presenting, in response to an incoming communication connection directed to said unique telephone number, a calling party on said incoming communication connection with a menu indicative of a plurality of call routing choices;

determining, in response to said unique telephone number and said calling party transmitting data on said incoming communication connection indicative of a selection from said menu, an identity of a one of service personnel assigned to serve a subscriber associated with said unique telephone number, comprising:

storing, exclusive of any actions of said subscriber, data indicative of said unique telephone number and a set of said service personnel presently assigned to serve said subscriber associated with said unique telephone number, associating each of said menu choices with a corresponding one of said set of said service personnel presently assigned to serve said subscriber associated with said unique telephone number; and routing said incoming communication connection to a communication device assigned to said identified one of said service personnel to enable said one of said service personnel to provide information to said calling party, which information relates to the subscriber and is desired by the calling party.

7. The method of operating an incoming call routing system of claim 6 wherein said step of determining further comprises:

storing in a memory data indicative of a telephone number of a one of said communication devices assigned to said identified one of service personnel.

8. The method of operating an incoming call routing system of claim 7 wherein said step of determining further comprises:

storing in a memory subscriber specific data; and transmitting said subscriber specific data to said identified one of service personnel via said incoming communication connection.

9. The method of operating an incoming call routing system of claim 6 wherein said step of routing comprises:

operating a wireless communication system, connected to said private branch exchange switching system, to establish a wireless communication connection from said private branch exchange switching system to a wireless communication device assigned to said identified one of service personnel.

10. The method of operating an incoming call routing system of claim 6 further comprising:

providing, in response to establishment of said incoming communication connection, data to said identified one of service personnel that identifies said subscriber.

* * * * *